(12) United States Patent
Obrador

(10) Patent No.: US 8,392,834 B2
(45) Date of Patent: Mar. 5, 2013

(54) SYSTEMS AND METHODS OF AUTHORING A MULTIMEDIA FILE

(75) Inventor: Pere Obrador, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3329 days.

(21) Appl. No.: 10/410,426

(22) Filed: Apr. 9, 2003

(65) Prior Publication Data

US 2004/0201609 A1    Oct. 14, 2004

(51) Int. Cl.
*G06F 3/048* (2006.01)
*G06F 3/00* (2006.01)
*G06G 5/00* (2006.01)
*H04N 5/445* (2011.01)

(52) U.S. Cl. ........ 715/723; 715/719; 715/720; 715/721; 715/722; 725/61

(58) Field of Classification Search .......... 715/719–723; 725/61
See application file for complete search history.

(56) References Cited

U.S. PATENT DOCUMENTS

| | | | |
|---|---|---|---|
| 5,521,841 A | 5/1996 | Arman et al. | |
| 5,600,775 A | 2/1997 | King et al. | |
| 5,655,117 A | 8/1997 | Goldberg et al. | |
| 5,703,795 A * | 12/1997 | Mankovitz ............... | 715/721 |
| 5,710,591 A | 1/1998 | Bruno et al. | |
| 5,751,289 A | 5/1998 | Myers | |
| 5,821,945 A | 10/1998 | Yeo et al. | |
| 5,864,366 A | 1/1999 | Yeo | |
| 5,905,981 A | 5/1999 | Lawler et al. | |
| 5,956,026 A | 9/1999 | Ratakonda | |
| 5,983,218 A | 11/1999 | Syeda-Mahmood | |
| 5,983,236 A | 11/1999 | Yager et al. | |
| 5,995,095 A | 11/1999 | Ratakonda | |
| 6,041,147 A | 3/2000 | Mead | |
| 6,044,089 A | 3/2000 | Ferriere | |
| 6,044,365 A | 3/2000 | Cannon et al. | |
| 6,144,375 A | 11/2000 | Jain et al. | |
| 6,166,735 A | 12/2000 | Dom et al. | |
| 6,199,076 B1 | 3/2001 | Logan et al. | |
| 6,219,837 B1 | 4/2001 | Yeo et al. | |
| 6,222,532 B1 | 4/2001 | Ceccarelli | |

(Continued)

FOREIGN PATENT DOCUMENTS

| | | |
|---|---|---|
| EP | 1213667 | 6/2002 |
| WO | WO0127876 | 4/2001 |

OTHER PUBLICATIONS

Williams et al., Home Sweet Home Page, 1996, Peachpit Press, abstract.*

(Continued)

*Primary Examiner* — Jordany Nunez

(57) ABSTRACT

Systems and methods of authoring a multimedia file are described. In one method of authoring a multimedia file, a collection of media objects, including a reference media object of indexed temporally-ordered data structures, is accessed. The reference media object is rendered. While the reference media object is being rendered, a media object in the collection is linked to the reference media object with a rendering time synchronized to the rendering of the reference media object. In another multimedia file authoring method, a collection of inter-linked media objects is accessed. Media objects are sequentially rendered in accordance with a sequence of media object links selected by a user while media objects are being rendered. The sequence of selected media object links and synchronization data are stored to enable reproduction of media object rendering experienced by the user.

35 Claims, 13 Drawing Sheets

U.S. PATENT DOCUMENTS

| | | |
|---|---|---|
| 6,226,655 B1 | 5/2001 | Borman et al. |
| 6,233,367 B1 | 5/2001 | Craver et al. |
| 6,236,395 B1 | 5/2001 | Sezan et al. |
| 6,268,864 B1 | 7/2001 | Chen et al. |
| 6,301,586 B1 | 10/2001 | Yang et al. |
| 6,317,740 B1 | 11/2001 | Mukherjea et al. |
| 6,332,144 B1 | 12/2001 | deVries et al. |
| 6,411,724 B1 | 6/2002 | Vaithilingam et al. |
| 6,426,778 B1 | 7/2002 | Valdez |
| 6,473,096 B1 | 10/2002 | Kobayashi et al. |
| 6,480,191 B1 | 11/2002 | Balabanovic |
| 6,535,889 B1 | 3/2003 | Headrick et al. |
| 6,538,665 B2 | 3/2003 | Creow et al. |
| 6,567,980 B1 * | 5/2003 | Jain et al. ............ 725/61 |
| 6,570,587 B1 * | 5/2003 | Efrat et al. ............ 715/723 |
| 6,571,054 B1 | 5/2003 | Tonomura et al. |
| 6,693,652 B1 | 2/2004 | Barrus et al. |
| 6,721,741 B1 | 4/2004 | Eyal et al. |
| 6,847,977 B2 | 1/2005 | Abajiam |
| 6,892,351 B2 | 5/2005 | Vasudevan et al. |
| 6,925,474 B2 | 8/2005 | McGrath et al. |
| 7,076,503 B2 | 7/2006 | Platt et al. |
| 7,480,864 B2 * | 1/2009 | Brook et al. ............ 715/720 |
| 2001/0023450 A1 | 9/2001 | Chu |
| 2001/0034740 A1 | 10/2001 | Kerne |
| 2002/0019833 A1 * | 2/2002 | Hanamoto ............ 707/500 |
| 2002/0033844 A1 * | 3/2002 | Levy et al. ............ 345/744 |
| 2002/0051077 A1 | 5/2002 | Liou et al. |
| 2002/0069218 A1 | 6/2002 | Sull et al. |
| 2002/0112028 A1 | 8/2002 | Colwill |
| 2002/0169829 A1 | 11/2002 | Shuster |
| 2002/0188959 A1 | 12/2002 | Piotrowski |
| 2003/0009469 A1 | 1/2003 | Platt et al. |
| 2003/0061612 A1 | 3/2003 | Lee et al. |
| 2003/0078144 A1 | 4/2003 | Gehrke et al. |
| 2003/0158953 A1 | 8/2003 | Lal |
| 2003/0184579 A1 | 10/2003 | Zhang et al. |
| 2003/0192049 A1 * | 10/2003 | Schneider et al. ............ 725/51 |
| 2004/0122731 A1 | 6/2004 | Mannik et al. |
| 2005/0102624 A1 * | 5/2005 | McIntyre ............ 715/723 |
| 2005/0155086 A1 * | 7/2005 | Schick et al. ............ 725/153 |

OTHER PUBLICATIONS

Source code of page of larger 1st image Bei_ChiliRistra [1]—http://hopm.sprintmail.com/~janerickson/.

Source code of thumbnail page JansChinaWebPage_Pictures[1]—http://home.sprintmail.com/~janerickson/.

Jan's Visit to China—Oct. 2000—JansChinaWeb Page—9 pages.

Benitez, Ana B et al—"Object-Based Multimedia Content Description Schemes and Applications for MPEG-7"—Signal Prcessing: Image Communication 16 (2000)—pp. 235-269.

Huang, Qian et al—"Multimedia Search and Retrieval: New Concepts, System Implementation, and Application"—IEEE Trans on Circ and Sys for Video Technology vol. 10 No. 5—Aug. 2000.

Li, Francis et al—"Browsing Digital Video"—In Proceedings of SIGCHI—pp. 169-176.

O'Connor, N et al—"News Story Segmentation in the Fischlar Video Indexing System"—ICIP 2001 Conference Proceedings—pp. 418-421.

* cited by examiner

SYSTEMS AND METHODS OF AUTHORING A MULTIMEDIA FILE

CROSS-REFERENCE TO RELATED APPLICATIONS

This application is related to the following applications, each of which is incorporated herein by reference: U.S. application Ser. No. 10/117,033, filed Apr. 5, 2002, by Pere Obrador, and entitled "Media Object Management;" and U.S. application Ser. No. 10/207,279, filed Sep. 29, 2002, by Pere Obrador, and entitled "Presenting a Collection of Media Objects."

TECHNICAL FIELD

This invention relates to systems and methods of authoring a multimedia file.

BACKGROUND

Individuals and organizations are rapidly accumulating large collections of digital content, including text, audio, graphics, animated graphics and full-motion video. This content may be presented individually or combined in a wide variety of different forms, including documents, presentations, music, still photographs, commercial videos, home movies, and meta data describing one or more associated digital content files. As these collections grow in number and diversity, individuals and organizations increasingly will require systems and methods for organizing and browsing the digital content in their collections. To meet this need, a variety of different systems and methods for creating and browsing selected kinds of digital content have been proposed.

For example, storyboard browsing has been developed for browsing full-motion video content. In accordance with this technique, video information is condensed into meaningful representative snapshots and corresponding audio content. One known video browser of this type divides a video sequence into equal length segments and denotes the first frame of each segment as its key frame. Another known video browser of this type stacks every frame of the sequence and provides the user with information regarding the camera and object motions.

Content-based video browsing techniques also have been proposed. In these techniques, a long video sequence typically is classified into story units based on video content. In some approaches, scene change detection (also called temporal segmentation of video) is used to give an indication of when a new shot starts and ends. Scene change detection algorithms, such as scene transition detection algorithms based on DCT (Discrete Cosine Transform) coefficients of an encoded image, and algorithms that are configured to identify both abrupt and gradual scene transitions using the DCT coefficients of an encoded video sequence are known in the art.

In one video browsing approach, Rframes (representative frames) are used to organize the visual contents of video clips. Rframes may be grouped according to various criteria to aid the user in identifying the desired material. In this approach, the user may select a key frame, and the system then uses various criteria to search for similar key frames and present them to the user as a group. The user may search representative frames from the groups, rather than the complete set of key frames, to identify scenes of interest. Language-based models have been used to match incoming video sequences with the expected grammatical elements of a news broadcast. In addition, a priori models of the expected content of a video clip have been used to parse the clip.

In another approach, a hierarchical decomposition of a complex video selection is extracted for video browsing purposes. This technique combines visual and temporal information to capture the important relations within a scene and between scenes in a video, thus allowing the analysis of the underlying story structure with no a priori knowledge of the content. A general model of a hierarchical scene transition graph is applied to an implementation for browsing. Video shots are first identified and a collection of key frames is used to represent each video segment. These collections then are classified according to gross visual information. A platform is built on which the video is presented as directed graphs to the user, with each category of video shots represented by a node and each edge denoting a temporal relationship between categories. The analysis and processing of video is carried out directly on the compressed videos.

A variety of different techniques that allow media files to be searched through associated annotations also have been proposed. For example, in one approach, audio/video media is processed to generate annotations that are stored in an index server. A user may browse through a collection of audio/video media by submitting queries to the index server. In response to such queries, the index server transmits to a librarian client each matching annotation and a media identification number associated with each matching annotation. The librarian client transmits to the user the URL (uniform resource locator) of the digital representation from which each matching annotation was generated and an object identification number associated with each matching annotation. The URL may specify the location of all or a portion of a media file.

SUMMARY

In one aspect, the invention features a method of authoring a multimedia file in accordance with which a collection of media objects, including a reference media object of indexed temporally-ordered data structures, is accessed. The reference media object is rendered. While the reference media object is being rendered, a media object in the collection is linked to the reference media object with a rendering time synchronized to the rendering of the reference media object.

In another multimedia file authoring method of the invention, a collection of inter-linked media objects is accessed. Media objects are sequentially rendered in accordance with a sequence of media object links selected by a user while media objects are being rendered. The sequence of selected media object links and synchronization data are stored to enable reproduction of media object rendering that was experienced by the user.

The invention also features systems for implementing the above-described multimedia file authoring methods.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Media Management System Overview

Figure 1:
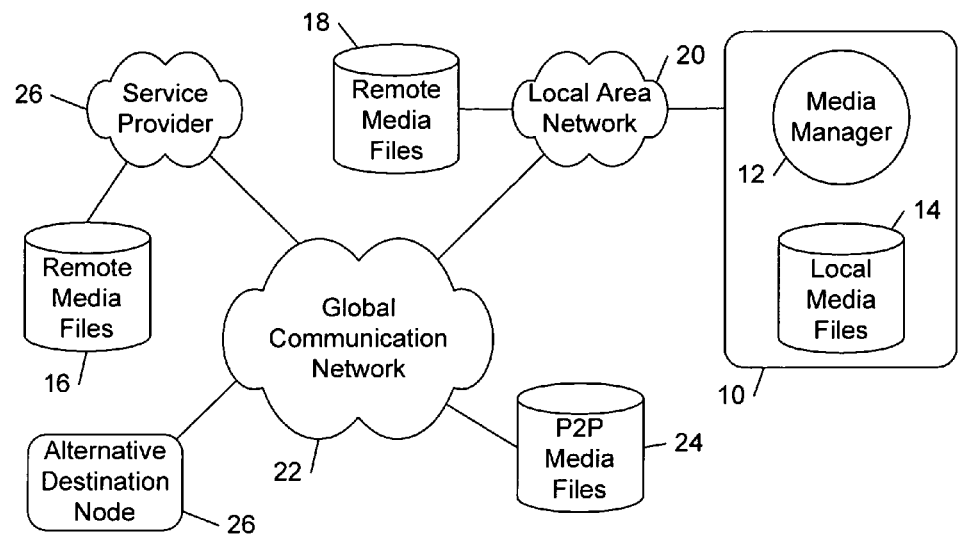
FIG. 1 is a diagrammatic view of a media management node coupled directly to a set of local media files and coupled indirectly to multiple sets of remote media files over a local area network and a global network infrastructure.

Referring to FIG. 1, in one embodiment, a media management node 10 includes a media manager 12 that is configured to enable all forms of digital content in a selected collection of media objects to be organized into a browsable context-sensitive, temporally-referenced media database or data structure. As used herein, the term "media object" refers broadly to any form of digital content, including text, audio, graphics, animated graphics and full-motion video. This content is implemented as one or more data structures that may be packaged and presented individually or in some combination in a wide variety of different forms, including documents, annotations, presentations, music, still photographs, commercial videos, home movies, and meta data describing one or more associated digital content files. As used herein, the term "data structure" refers broadly to the physical layout (or format) in which data is organized and stored. The media objects may be stored physically in a local database 14 of media management node 10 or in one or more remote databases 16, 18 that may be accessed over a local area network 20 and a global communication network 22, respectively. Some media objects also may be stored in a remote database 24 that is accessible over a peer-to-peer network connection. In some embodiments, digital content may be compressed using a compression format that is selected based upon digital content type (e.g., an MP3 or a WMA compression format for audio works, and an MPEG or a motion JPEG compression format for audio/video works). The requested digital content may be formatted in accordance with a user-specified transmission format. For example, the requested digital content may be transmitted to the user in a format that is suitable for rendering by a computer, a wireless device, or a voice device.

In addition, the requested digital content may be transmitted to the user as a complete file or in a streaming file format.

A user may interact with media manager 12 locally, at media management node 10, or remotely, over local area network 20 or global communication network 22. Transmissions between media manager 12, the user, and the content providers may be conducted in accordance with one or more conventional secure transmission protocols. For example, each digital work transmission may involve packaging the digital work and any associated meta-data into an encrypted transfer file that may be transmitted securely from one entity to another.

Global communication network 22 may include a number of different computing platforms and transport facilities, including a voice network, a wireless network, and a computer network. Media object requests may be transmitted, and media object replies may be presented in a number of different media formats, such as voice, Internet, e-mail and wireless formats. In this way, users may access the services provided by media management node 10 and the remote media objects 16 provided by service provider 26 and peer-to-peer node 24 using any one of a wide variety of different communication devices. For example, in one illustrative implementation, a wireless device (e.g., a wireless personal digital assistant (PDA)) may connect to media management node 10, service provider 26, and peer-to-peer node 24 over a wireless network. Communications from the wireless device may be in accordance with the Wireless Application Protocol (WAP). A wireless gateway converts the WAP communications into HTTP messages that may be processed by service provider 10. In another illustrative implementation, a voice device (e.g., a conventional telephone) may connect to media management node 10, service provider 26 and peer-to-peer node 24 over a voice network. Communications from the voice device may be in the form of conventional analog or audio signals, or they may be formatted as VoxML messages. A voice gateway may use speech-to-text technology to convert the audio signals into HTTP messages; VoxML messages may be converted to HTTP messages based upon an extensible style language (XSL) style specification. The voice gateway also may be configured to receive real time audio messages that may be passed directly to the voice device. Alternatively, the voice gateway may be configured to convert formatted messages (e.g., VoxML, XML, WML, e-mail) into a real time audio format (e.g., using text-to-speech technology) before the messages are passed to the voice device. In a third illustrative implementation, a software program operating at a client personal computer (PC) may access the services of media management node 10 and the media objects provided by service provider 26 and peer-to-peer node 24 over the Internet.

As explained in detail below, in some embodiments, media manager 12 enables a user to organize and browse through a selected collection of media objects by means of a set of links between media objects. In general, all media objects may be indexed by any other media object in the selected collection. Each link may be browsed from one media object to a linked media object, and vice versa. The set of links between media objects may be generated by a user, a third party, or automatically by media manager 12. These links are stored separately from the media objects in one or more media object linkage data structures that are accessible by the media manager 12. For example, in some implementations, each media object has an associated XML (extensible Markup Language) file containing meta data (e.g., a Uniform Resource Locator (URL) address) relating to the media objects that have been linked to the media object.

Media manager 12 may provide access to a selected digital content collection in a variety of different ways. In one embodiment, a user may organize and browse through a personal collection of a diverse variety of interlinked media objects. In another embodiment, media manager 12 may operate an Internet web site that may be accessed by a conventional web browser application program executing on a user's computer system. The web site may present a collection of personal digital content, commercial digital content and/or publicly available digital content. The web site also may provide additional information in the form of media objects that are linked to the available digital content. Users may specify links to be generated and browse through the collection of digital content using media objects as links into and out of specific digital content files. In an alternative embodiment, a traditional brick-and-mortar retail establishment (e.g., a bookstore or a music store) may contain one or more kiosks (or content preview stations). The kiosks may be configured to communicate with media manager 12 (e.g., over a network communication channel) to provide user access to digital content that may be rendered at the kiosk or transferred to a user's portable media device for later playback. A kiosk may include a computer system with a graphical user interface that enables users to establish links and navigate through a collection of digital content that is stored locally at the retail establishment or that is stored remotely and is retrievable over a network communication channel. A kiosk also may include a cable port that a user may connect to a portable media device for downloading selected digital content.

In embodiments in which a user interacts remotely with media manager 12, the user may store the media object linkage data structures that are generated during a session in a portable storage device or on a selected network storage location that is accessible over a network connection.

Figure 2:
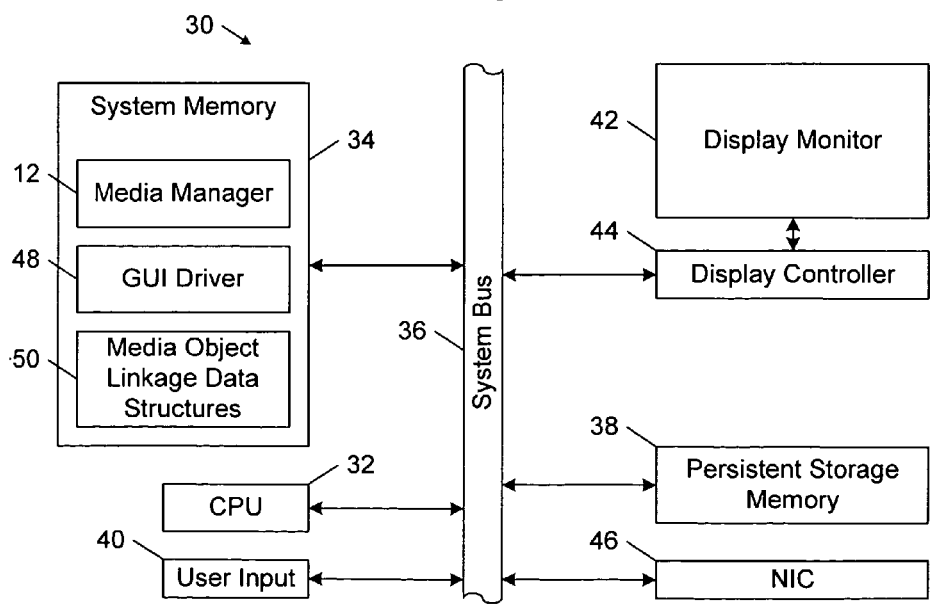
FIG. 2 is a diagrammatic view of a computer system that is programmable to implement a method of managing media objects.

Referring to FIG. 2, in one embodiment, media manager 12 may be implemented as one or more respective software modules operating on a computer 30. Computer 30 includes a processing unit 32, a system memory 34, and a system bus 36 that couples processing unit 32 to the various components of computer 30. Processing unit 32 may include one or more processors, each of which may be in the form of any one of various commercially available processors. System memory 34 may include a read only memory (ROM) that stores a basic input/output system (BIOS) containing start-up routines for computer 30 and a random access memory (RAM). System bus 36 may be a memory bus, a peripheral bus or a local bus, and may be compatible with any of a variety of bus protocols, including PCI, VESA, Microchannel, ISA, and EISA. Computer 30 also includes a persistent storage memory 38 (e.g., a hard drive, a floppy drive 126, a CD ROM drive, magnetic tape drives, flash memory devices, and digital video disks) that is connected to system bus 36 and contains one or more computer-readable media disks that provide non-volatile or persistent storage for data, data structures and computer-executable instructions. A user may interact (e.g., enter commands or data) with computer 30 using one or more input devices 40 (e.g., a keyboard, a computer mouse, a microphone, joystick, and touch pad). Information may be presented through a graphical user interface (GUI) that is displayed to the user on a display monitor 42, which is controlled by a display controller 44. Computer 30 also may include peripheral output devices, such as speakers and a printer. One or more remote computers may be connected to computer 30 through a network interface card (NIC) 46.

As shown in FIG. 2, system memory 34 also stores media manager 12, a GUI driver 48, and one or more media object linkage structures 50. Media manager 12 interfaces with the GUI driver 48 and the user input 40 to control the creation of the media object linkage data structures 50. Media manager 12 also interfaces with the GUI driver 48 and the media object linkage data structures to control the media object browsing experience presented to the user on display monitor 42. The media objects in the collection to be linked and browsed may be stored locally in persistent storage memory 38 or stored remotely and accessed through NIC 46, or both.

Linking Media Objects

Automatic and Manual Linking of Media Objects

Figure 3:
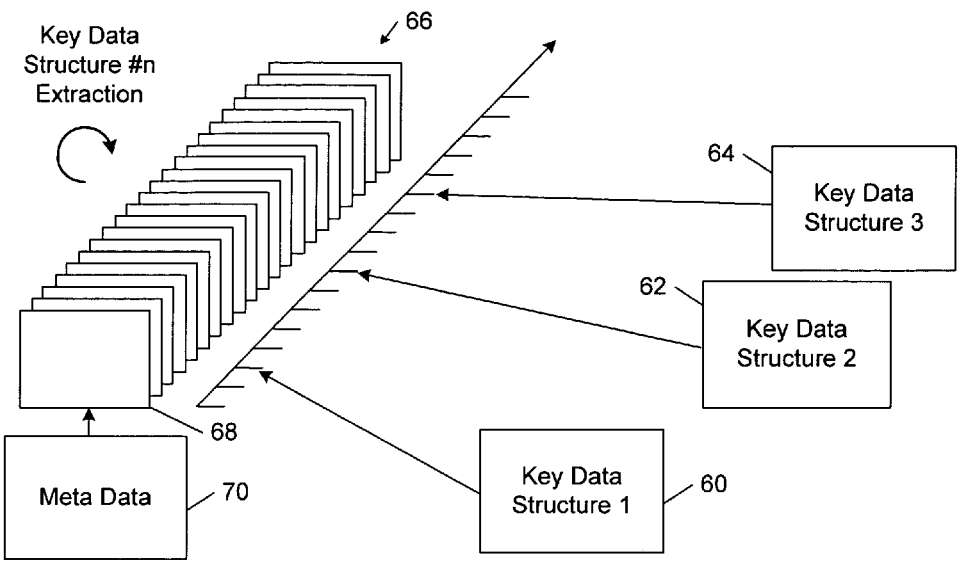
FIG. 3 is a diagrammatic perspective view of a media file of indexed, temporally-ordered data structures and an automatically-generated selection of key data structures.

Referring to FIG. 3, in one embodiment, media manager 12 may be configured to automatically generate a selection of key data structures 60, 62, 64 from a media file 66 of indexed, temporally-ordered data structures. Media file 66 may correspond to any kind of digital content that is indexed and temporally-ordered (i.e., ordered for playback in a specific time sequence), including frames of a full-motion video, animated graphics, slides (e.g., PowerPoint® slides, text slides, and image slides) organized into a slideshow presentation, and segments of audio. Key data structures 60-64 may be extracted in accordance with any one of a variety of conventional automatic key data structure extraction techniques (e.g., automatic key frame extraction techniques used for full-motion video). Media manager 12 also may be configured to link meta data 70 with the first data structure 68 of media file 66. In this embodiment, each of the media file data structures is associated with an index value (e.g., a frame number or time-stamp number for full-motion video). Each of the links between media objects 60-64, 70 and media file data structures 68 is a pointer between the index value associated with the media file data structure 68 and the address of one of the linked media objects 60-64, 70. Each link is browsable from a given data structure of media file 66 to a media object 60-64, 70, and vice versa. The links may be stored in one or more media object data link structures in, for example, an XML (Extensible Markup Language) format.

In some embodiments, in addition to storing a link between a media object and a data structure of a reference media file, a media object data linkage structure may include meta data describing where a link to the media object may be activated while the linked data structure is being rendered. For example, a link may be established between a high resolution photograph of a person and a video frame of a full motion video reference file in which that person appears. In addition, the link may be associated with the specific location in the video frame where that person appears so that, during playback, a user may jump to the high resolution photograph by selecting the area in the video frame where the activatable link is located.

Figure 4:
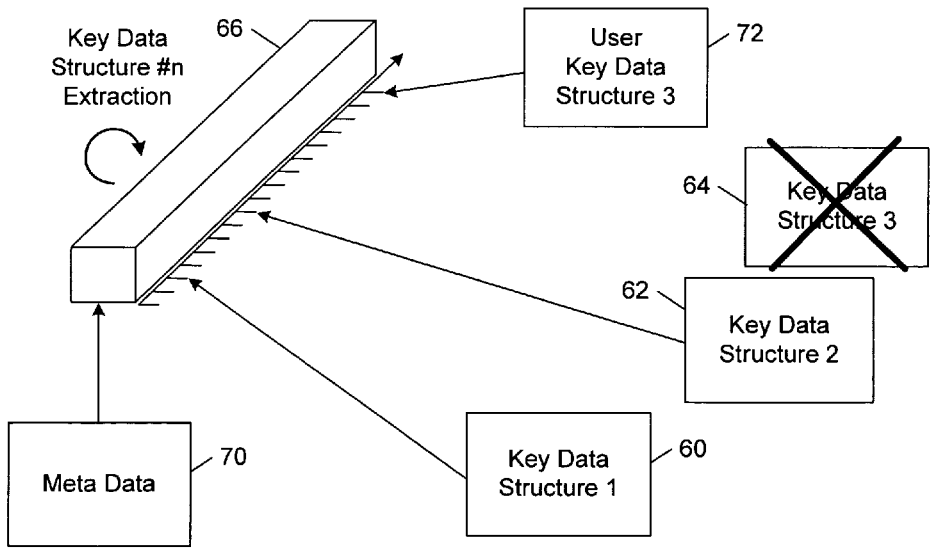
FIG. 4 is a diagrammatic perspective view of the media file of FIG. 3 after the selection of key data structures has been modified by a user.

As shown in FIG. 4, in one embodiment, media manager 12 is configured to modify the initial selection of key data structures in response to user input. For example, in the illustrated embodiment, a user may remove key data structure 64 and add a new key data structure 72. In addition, a user may change the data structure of media file 66 to which key data structure 62 is linked. In some embodiments, a user may view a presentation of media file 66 in an editor program designed to allow the user to pause the media file presentation and specify links between selected data structures of media file 66 and one or more media objects.

Figure 5:
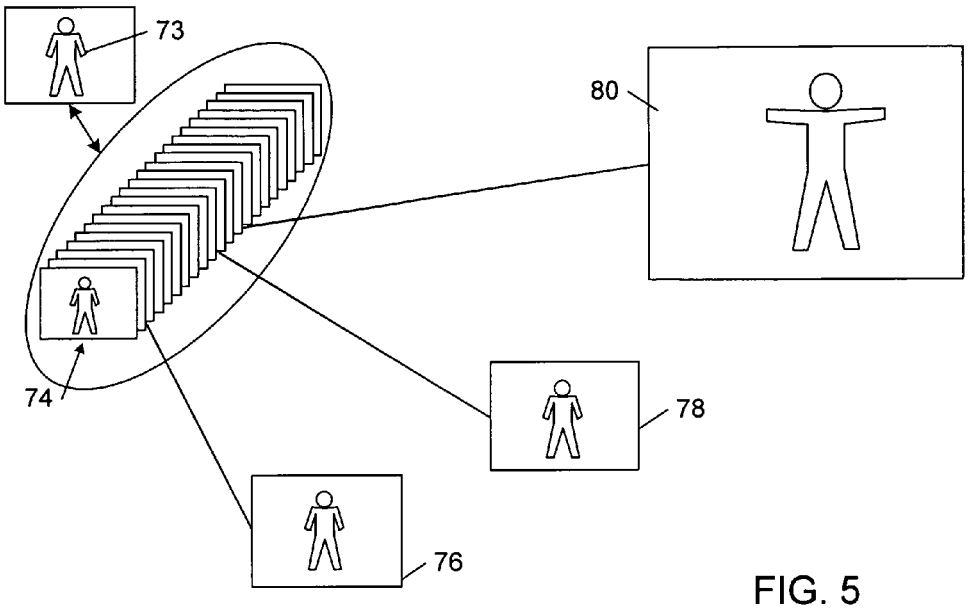
FIG. 5 is a diagrammatic perspective view of an indexed media file containing a sequence of full-motion video frames, a selection of key frames, and a high resolution still photograph.
Figure 6:
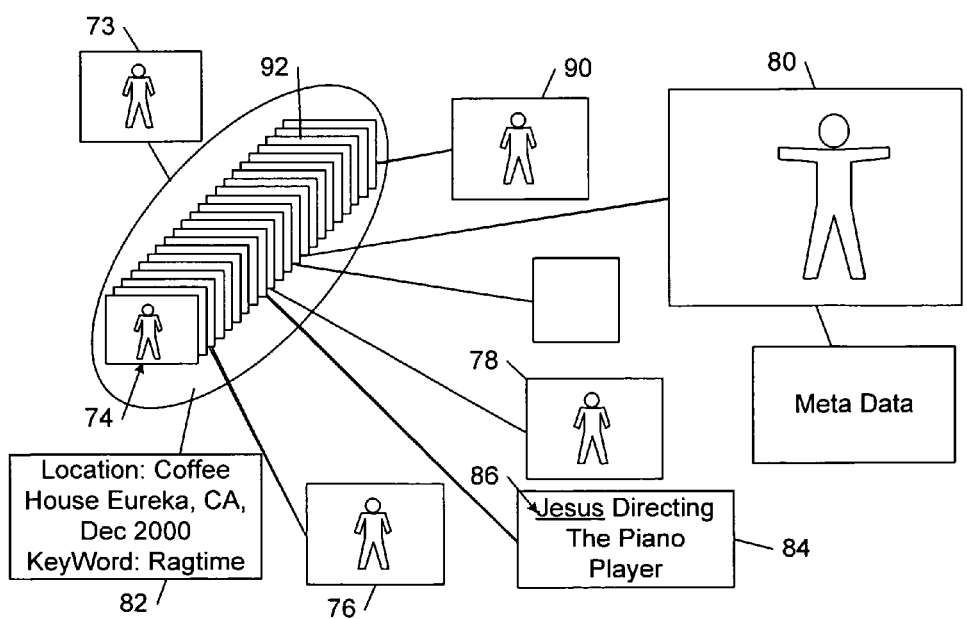
FIG. 6 is a diagrammatic perspective view of the indexed media file, key frame selection and high resolution still photograph of FIG. 5, along with multiple user-selected media objects that are linked to respective video frames of the indexed media file.

Referring to FIGS. 5 and 6, in one illustrative embodiment, media file 66 corresponds to a video file sequence 73 of full-motion video frames 74. After automatic key frame extraction and user-modification, two key frames 76, 78 and a high resolution still photograph 80 are linked to video file 73. As shown in FIG. 6, in addition to modifying the selection of key frames 76-80, a user may link other media objects to the video frames 74. For example, the user may link a text file annotation 82 to video file 73. The user also may link an XHTML (Extensible HyperText Markup Language) document 84 to the video frame corresponding to key frame 78. XHTML document 84 may include a hypertext link 86 that contains the URL (Uniform Resource Locator) for another media object (e.g., a web page). The user also may link an audio file 88 to a video frame of video file 73. In the illustrated embodiment, for example, the linked audio file 88 may correspond to the song being played by a person appearing in the linked video frame. The user also may link a full-motion video file 90 to a frame 92 of video file 73. In the illustrated embodiment, for example, the linked video file 90 may correspond to a video of a person appearing in the associated video frame 92. The user also may link to the high resolution still image 80 a text file 94 containing meta data relating to the associated still image 80. For example, in the illustrated embodiment, meta data file 94 may correspond to the meta data that was automatically generated by the video camera that captured the high-resolution still image.

Multimedia File Authoring System

Figure 7A:
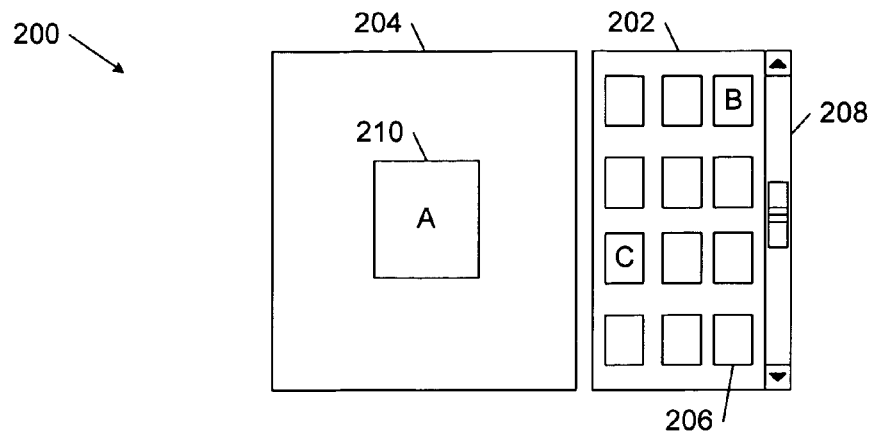
FIG. 7A is a diagrammatic view of an embodiment of a graphical user interface of a multimedia authoring system having an authoring area in which a reference media object is being rendered and a media object catalogue area containing symbols corresponding to respective media objects in a collection.

Referring to FIG. 7A, in some embodiments, a system for authoring a multimedia album page definition file includes a graphical user interface 200 that is displayable on a screen (e.g., a computer monitor screen) and includes a media object catalogue area 202 and an authoring area 204. Media object catalogue area 202 and authoring area 204 may be implemented as conventional computer graphics windows. Media object catalogue area 202 is operable to display symbols 206 that are representative of media objects in a collection. Media object symbols 206 may be implemented as any graphical symbols that identify the media objects respectively associated with the symbols. For example, graphical media objects, such as images and videos, may be represented by thumbnail image symbols, and text and audio media objects may be represented by text (e.g., words) that identify media objects with respective labels. Other media objects may be represented by respective icons that suggest the contents of the media objects. Media object catalogue area 202 includes a scrollbar 208 that enables a user to scroll the viewable portion of media object catalogue area 202 through the collection of media object symbols 206. Authoring area 204 is operable to render a reference media object 210 (A) of indexed temporally-ordered data structures. As used herein, the term "reference media object" refers to a media object that defines for the user at least a portion of the rendering timeframe of a multimedia album page, which is a windows-based GUI that is displayable on a screen and is operable to present (or render) the associated reference media object and one or more media objects that are linked and time-synchronized to the reference media object. Authoring area 204 may include one or more buttons that allows a user to control how media objects are rendered during the authoring session, including conventional play, stop, and pause control buttons, as well as one or more buttons that allow a user to specify how media objects will be rendered during playback of the multimedia album page, including special effect buttons, such as buttons that control the rendering rate, fade effects, and zoom effects.

A multimedia album page may have links to one or more reference media objects each of which has a respective timeframe when a reference media object is rendered during execution of the multimedia album page. The rendering timeframe of multiple reference media objects linked to a multimedia album page may overlap in whole or in part, or they may not overlap. The rendering timeframe of each reference media object may begin at any user-selected time relative to the start time of the associated multimedia album page.

Figure 7B:
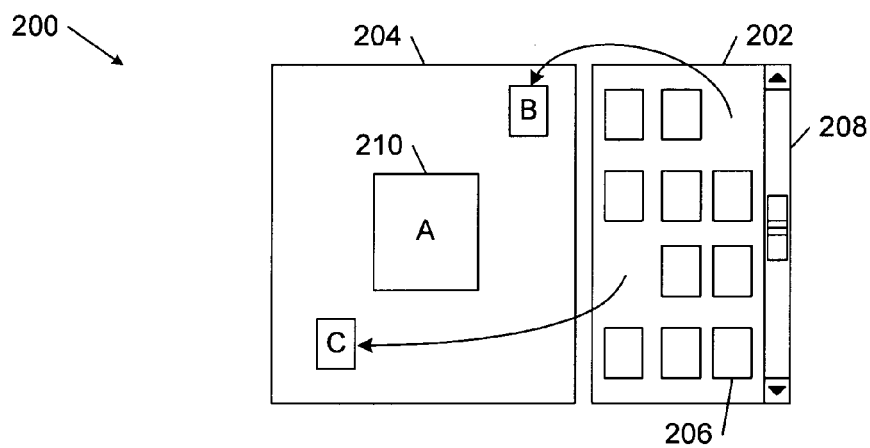
FIG. 7B is a diagrammatic view of the graphical user interface of FIG. 7A after a user has dragged symbols corresponding to two media objects from the media object catalogue area to respective locations in the authoring area of the graphical user interface.

Referring to FIG. 7B, in operation, a user is able to interact with graphical user interface 200 to author a multimedia file (i.e., a multimedia album page definition file) as follows. While reference media object 210 is being rendered in authoring area 204, a user may select a symbol 206 corresponding to a media object (e.g., media object B) in the media object catalogue area 202, drag the selected media object from media object catalogue area 202, and drop the selected media object in the authoring area 204. In some embodiments, a user may select media object symbols 206 with a conventional pointing device (e.g., a computer mouse). In response to the placement of media object symbol B in authoring area 204, multimedia file authoring system updates an existing or creates a new multimedia album page definition file containing a link to the associated media object and data synchronizing the associated media object to reference media object 210. In some embodiments, the multimedia album page definition file may be a SMIL 2.0 (Synchronized Multimedia Integration Language) file that contains a link to the reference media object 210, data specifying the rendering parameters for reference media object 210, a link to media object B, and indications of when and where media object B should be rendered relative to the rendering of reference media object 210. In some embodiments, the relative rendering time of media object B corresponds to the relative time when the symbol corresponding to media object B is dropped into authoring area 204 during rendering of reference media object 210 and the relative rendering location corresponds to the location in authoring area 204 wherein the media object symbol is dropped.

In some embodiments, the multimedia album page definition file also will include information controlling the way in which the associated media objects will be rendered during playback. Such playback control information may include special effects that were specified by the user. Such playback control information also may include an indication that only an activatable link to a particular media object is to be rendered, rather than playback of the particular media object itself. As explained above, such an activatable link may appear at a particular location in a data structure (or structures) of the reference media file that is being rendered.

As shown in FIG. 7B, after dropping the symbol corresponding to media object B in authoring area 204, a user may link another media object to reference media file 210 by dragging and dropping a symbol corresponding to another media object (e.g., media object C) from media object catalogue area 202 to authoring area 204. In response, the multimedia file authoring system updates the multimedia album page definition file with a link to media object C, and indications of when, where, and how media object C should be rendered relative to the rendering of reference media object 210. In some embodiments, a user may indicate when a rendering of a media object in authoring area should stop relative to the rendering of reference media file 210 by dragging the corresponding media object symbol out of the authoring area 204.

Figure 7C:
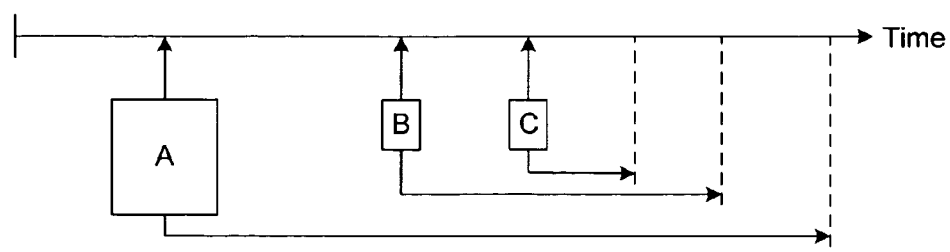
FIG. 7C is a diagrammatic view of a timeline illustrating how the media objects corresponding to the dragged symbols of FIG. 7B are synchronized to the reference media object.

As shown in FIG. 7C, in one exemplary illustration, a user may drag media object symbol C out of authoring area 204 and, subsequently, drag media object symbol B out of authoring area 204 before the rendering of reference media file 210 has terminated. The resulting multimedia album page definition file would contain the rendering time synchronization data specifying the rendering time relationships illustrated in the timeline of FIG. 7C.

Figure 8A:
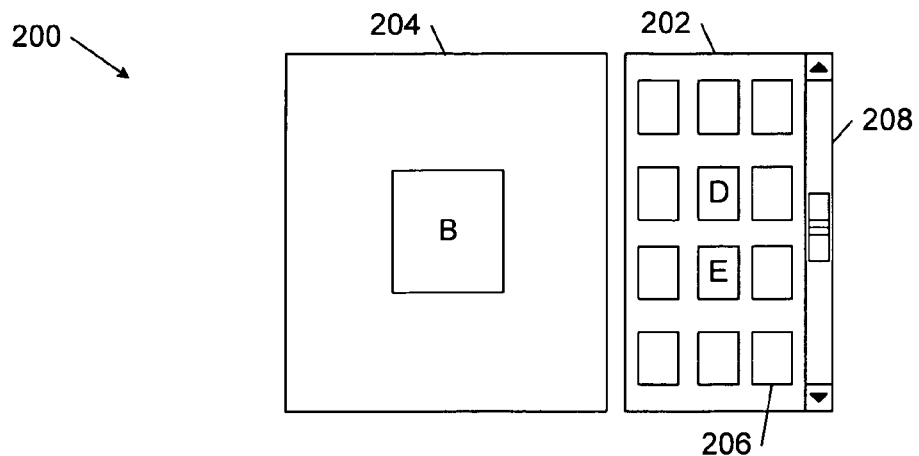
FIG. 8A is a diagrammatic view of the multimedia authoring system of FIG. 7A in which a second reference media object is being rendered in the authoring area of the graphical user interface.

Referring to FIG. 8A, in some embodiments, the multimedia file authoring system may be operable to allow a user to easily switch from one multimedia file authoring session to another multimedia file authoring session. For example, in the illustrated embodiment, after a user has inserted media object symbol B in authoring area 204 (FIG. 7B), the user may select (e.g., by clicking in a region over the symbol for media object B with a pointing device) media object B as the reference media object for a new multimedia file authoring session. In response, the multimedia file authoring system opens an existing multimedia album page definition file for media object B or creates a new multimedia album page definition file specifying media object B as the reference media object. The multimedia file authoring system also renders media object B in authoring area 204 and displays a collection of media object symbols 206 in media object catalogue area 202. The media object symbol collection may be the same as the media object symbol collection displayed during the authoring session for reference media object A, or it may be different.

Figure 8B:
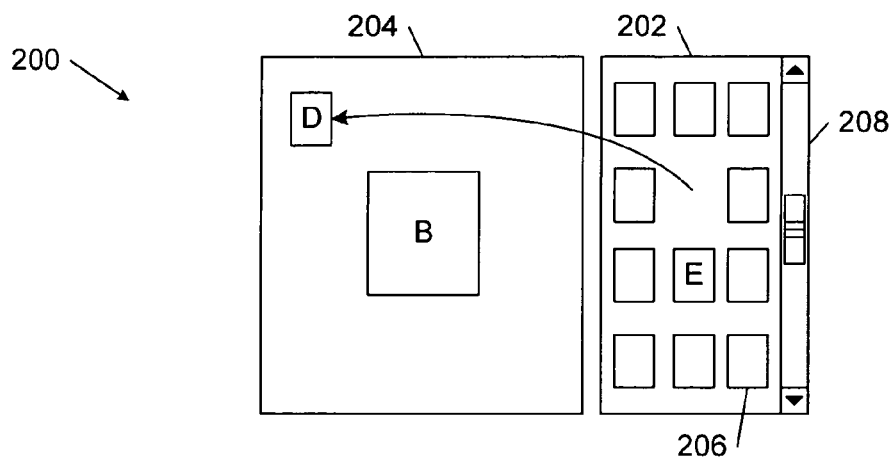
FIG. 8B is a diagrammatic view of the graphical user interface of FIG. 8A after a user has dragged a first media object symbol from the media object catalogue area to a location in the authoring area of the graphical user interface.
Figure 8C:
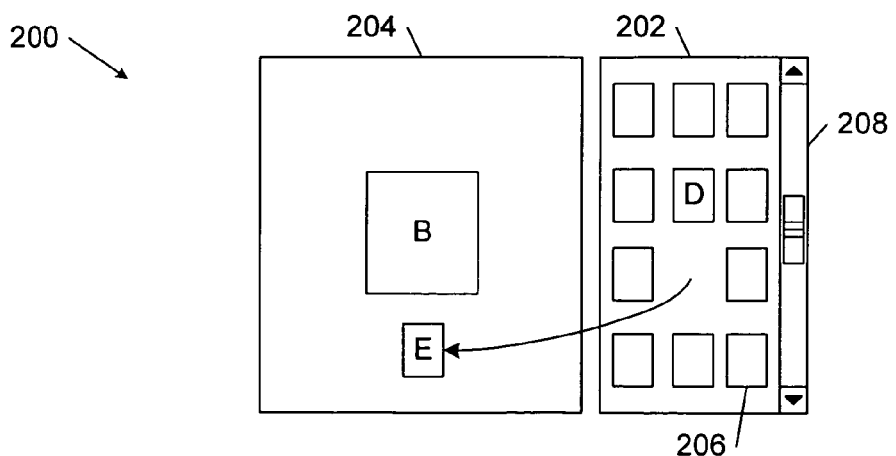
FIG. 8C is a diagrammatic view of the graphical user interface of FIG. 8B after the user has dragged the first media object symbol out of the authoring area and after the user has dragged a second media object symbol from the media object catalogue area to a location in the authoring area of the graphical user interface.
Figure 8D:
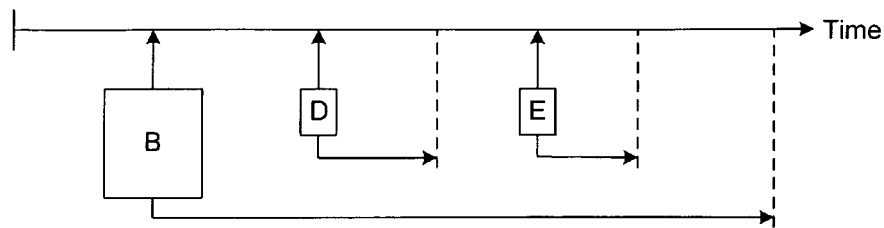
FIG. 8D is a diagrammatic view of a timeline illustrating how the media objects corresponding to the dragged symbols of FIGS. 8B and 8C are synchronized to the second reference media object.

As shown in FIGS. 8B and 8C, in one exemplary multimedia file authoring session for the multimedia album page corresponding to media object B, a user may drag media object symbol D from the media object catalogue area 202 and drop media object symbol D in authoring area 204. After a period of time during which reference media object B is being rendered, the user may drag media object symbol D out of authoring area 204. Subsequently, the user may drag media object symbol E from the media object catalogue area 202 and drop media object symbol E in authoring area 204. After a period of time during which reference media object B is being rendered, the user may drag media object symbol E out of authoring area 204 before the rendering of reference media file B has terminated. The resulting multimedia album page definition file would contain the rendering time synchronization data specifying the rendering time relationships illustrated in the timeline of FIG. 8D.

Before editing, an exemplary SMIL-based multimedia album page definition file may have the following structure:

```
< body >
    < par region = "video" >
    < video region = "video" src = "videos/demo/party_review_demo.mpg" fit = "meet"/ >
    < img id = "i_pere" region = "MME-2-content" dur = "15s" src = "photos\pereo[1].jpg" >
    < area id = "i_pere-1" show = "replace" href = "pere.smi"/ >
    < /img >
    < img id = "i_tretter" region = "MME-3-content" begin = "21" dur = "60s" src = "photos\tretter[1].jpg" >
    < area id = "i_tretter-1" show = "replace" href = "dan_main.smi"/ >
    < /img >
< /body >
```

Initially, during execution of this exemplary multimedia album page, a reference video (party_review_demo.mpg) is rendered beginning at time "0". This reference video serves as the main thread of the multimedia album page. After 15 seconds have passed, a new object (pereo[1].jpg) is rendered for 15 seconds in parallel with the reference video. The new object is a photograph that may be clicked to link the user to another multimedia album page (pere.smi). At a time of 21 seconds, a third multimedia object (tretter[1].jpg) will be rendered for 60 seconds. The third multimedia object may be clicked to link the user to another multimedia album page (dan_main.smi).

The above described multimedia album page may be edited (e.g., by dragging and dropping a media object into the authoring area, or by some other method). For example, a new media object (photo/logo) may be added to the multimedia page at a time of 25 seconds and with duration of 60 seconds. A user may click this object to access a web page http://imaging.hpl.hp.com/~tretter). After editing, the multimedia album page may have the following structure:

```
< body >
    < par region = "video" >
    < video region = "video" src = videos/demo/party_review_demo.mpg"
fit = "meet"/ >
        < img id = "i_pere" region = "MME-2-content" dur = "15s"
src = "photos\pereo[1].jpg" >
            < area id = "i_pere-1" show = "replace" href = "pere.smi"/ >
        < /img >
        < img id = "i_tretter" region = "MME-3-content" begin = "21"
dur = "60s" src = "photos\tretter[1].jpg" >
            < area id = "i_tretter-1" show = "replace" href = "dan_main.smi"/ >
        < /img >
        < a show = "replace" href = "http://imaging.hpl.hp.com/ ~ tretter" >
        < img region = "MME-3-world" begin = "25" dur = "60s"
src = "logos\web.jpg"/ >
        < /a >
    < /body >
```

Media Object Links

Figure 9A:
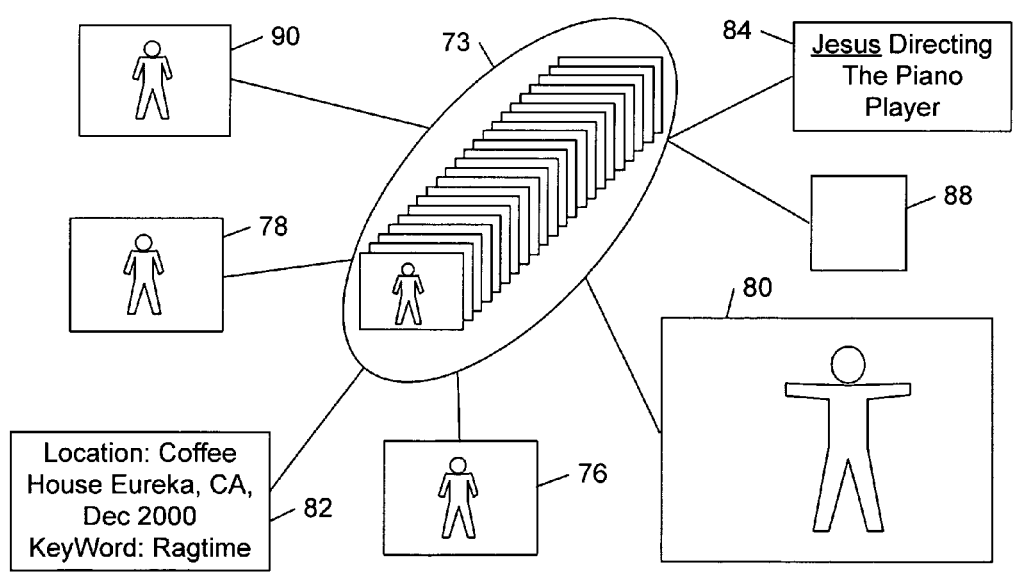
FIG. 9A is a diagrammatic perspective view of the links connecting the key frames, the high resolution still photograph, and the media objects to the indexed media file of FIG. 6.
Figure 9B:
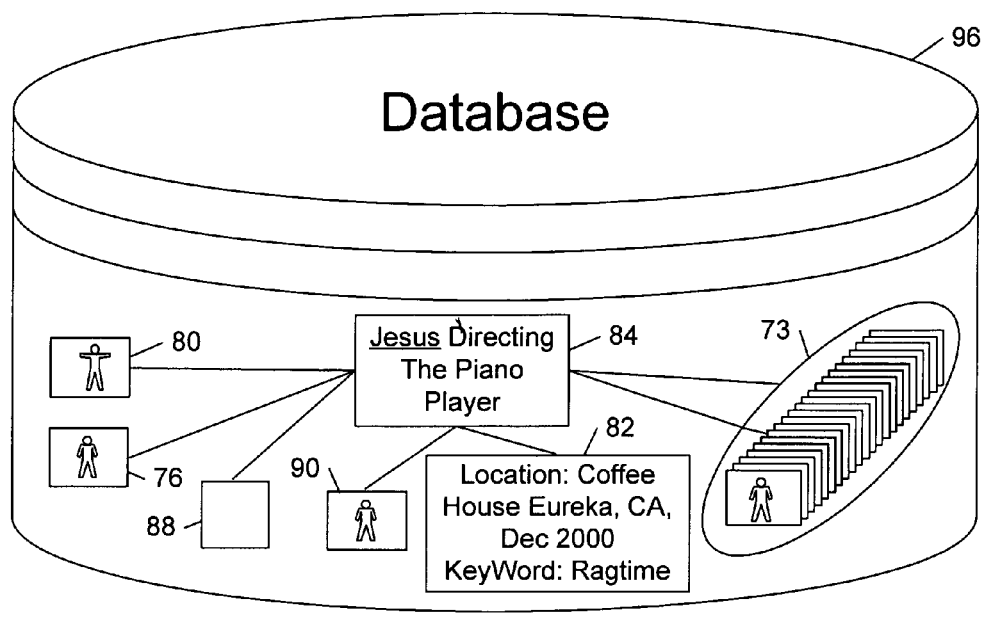
FIG. 9B is a diagrammatic perspective view of a database storing the indexed media file, key frames, high resolution still photograph, media objects and connecting links of FIG. 9A.

Referring to FIGS. 9A and 9B, in one embodiment, after video file 73 has been enriched with links to other media objects, the resulting collection of media objects (i.e., video file 73 and the media objects linked to video file 73) and media object linkage data structures (shown in FIG. 9A) may be stored as a context-sensitive, temporally-referenced media database 96 (shown in FIG. 9B). This database 96 preserves temporal relationships and associations between media objects. The database 96 may be browsed in a rich and meaningful way that allows target contents to be found rapidly and efficiently from associational links that may evolve over time. All media objects linked to the video file 73 may share previously created annotations and links with other media objects. In this way, new or forgotten associations may be discovered while browsing through the collection of media objects.

Figure 10A:
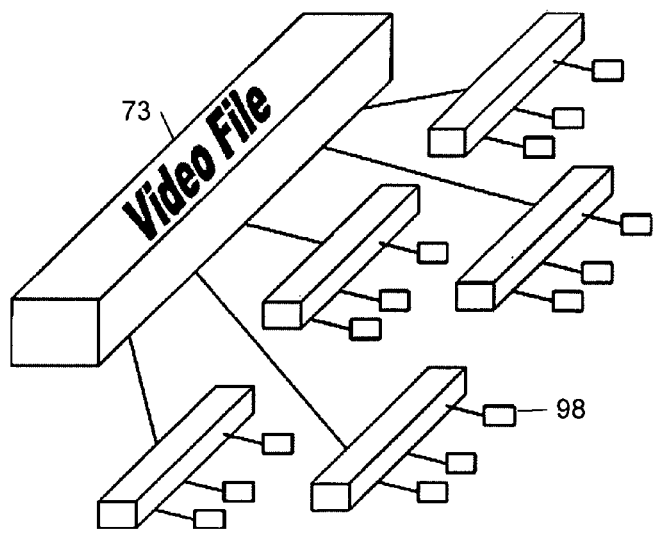
FIG. 10A is a diagrammatic perspective view of a video file mapped into a set of video sequences.
Figure 10B:
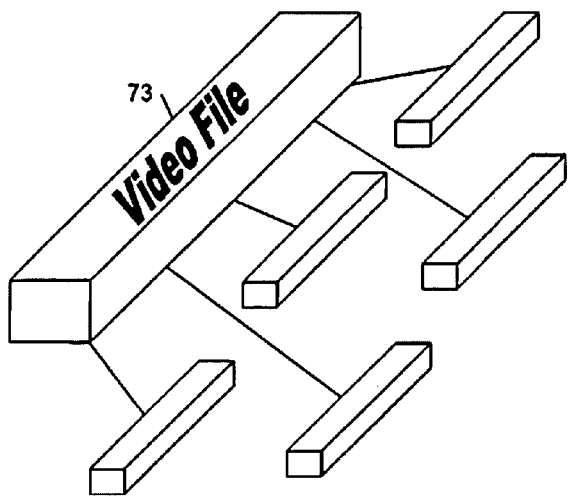
FIG. 10B is a diagrammatic perspective view of a set of video sequences mapped into a common video file.
Figure 10C:
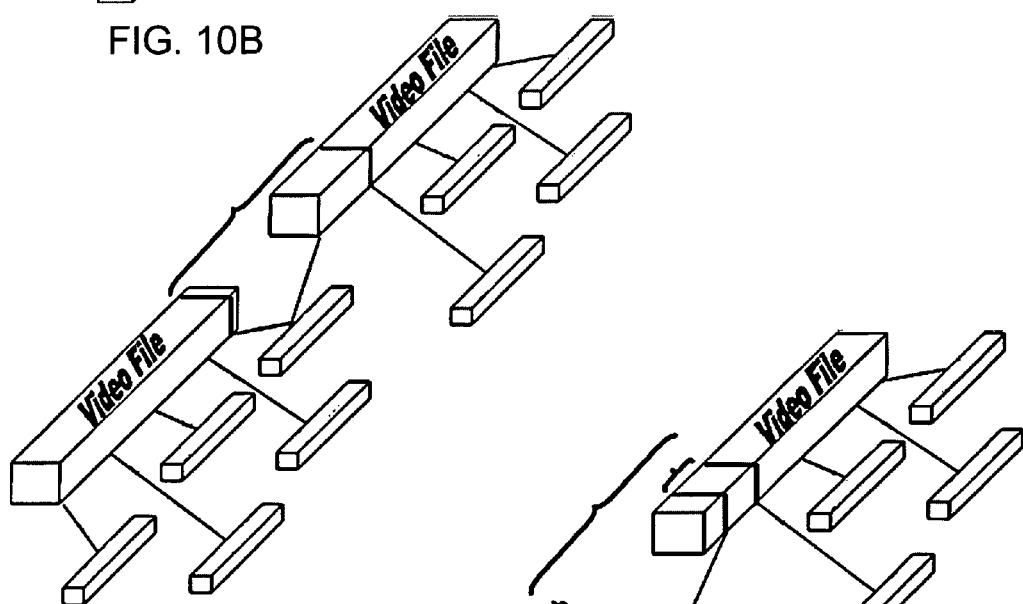
FIG. 10C is a diagrammatic perspective view of a set of consecutive video sequences mapped into two video files.
Figure 10D:
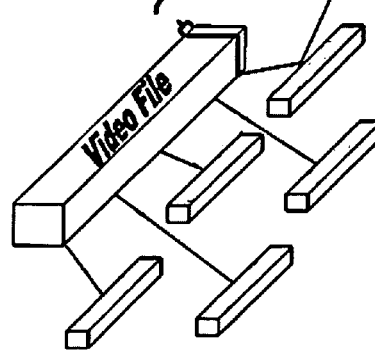
FIG. 10D is a diagrammatic perspective view of a set of non-consecutive video sequences mapped into two video files.

Referring to FIGS. 10A-10D, in some embodiments, all media files in a selected collection are stored only once in data base 96 (FIG. 9B). Each media file (e.g., video file 73) of indexed, temporally-ordered data structures may be split logically into a set of data structure sequences that are indexed with logical links into the corresponding media file. Media objects 98 may be indexed with logical links into the set of data structure sequences, as shown in FIG. 10A. Each data structure sequence link into a media file may identify a starting point in the media file and the length of the corresponding sequence. The data structure sequences may be consecutive, as shown in FIG. 10B, or non-consecutive. In addition, the set of data structure sequences may map consecutively into multiple media files, as shown in FIG. 10C. Alternatively, the set of data structure sequences may be mapped non-consecutively into multiple media files, as shown in FIG. 10D.

Presenting and Browsing a Collection a Media Objects

Figure 11:
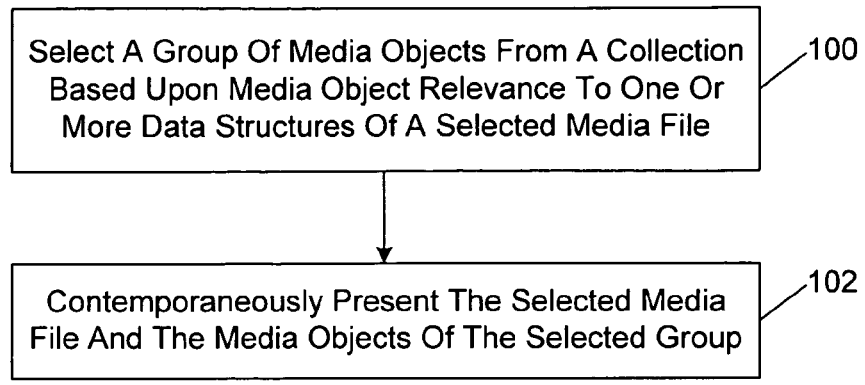
FIG. 11 is a flow diagram of a method of presenting a collection of media objects.

Referring to FIG. 11, in some embodiments, media manager 12 may be configured to present a collection of media objects to a user as follows. A group of media objects is selected from the collection based upon their relevance to one or more data structures of a selected media file of indexed, temporally-ordered data structures (step 100). As explained in U.S. application Ser. No. 10/207,279, filed Sep. 29, 2002, by Pere Obrador, and entitled "Presenting a Collection of Media Objects," the relevance criterion for selecting media objects may relate to browsable links between media objects and the selected media file, or the relevance criteria may relate to a selected context similarity between media objects and the selected media file. Next, the media file and the media objects of the selected group are presented contemporaneously (i.e., during a common period of time) to a user for browsing (step 102). The media file and the media objects preferably are presented to the user through a multimedia album page, which is a windows-based GUI that is displayed on display monitor 42 (FIG. 2).

Browsing Media Object Links

In some embodiments, the inter-media-object linking architecture described above may be used by media manager 12 to present the media objects of a collection to a user in a context-sensitive, temporally-referenced way through a multimedia album page 104, which is anchored to a selected reference media file (e.g., video file 73). For example, media manager 12 may present the data structures of the media file in sequence and, during this presentation, media manager 12 may present media objects in the selected group at times when they are relevant to the data structure (or data structure sequence) currently being presented to the user. In these embodiments, the relevance criterion for selecting the group of objects contemporaneously with the media file relates to the existence of browsable links between the selected media objects and data structures of the media file. The browsable links may be established automatically by media manager 12 and modified by a user, as described above. The browsable links also may be established by media manager 12 just before (e.g., during a preprocessing period) or on the fly during the presentation of the media file by instantiating one or more context matching processes (e.g., a face recognition process, a voice recognition process, or other pattern matching process) between the data structures of the media file being presented and the other media objects in the collection.

Figure 12A:
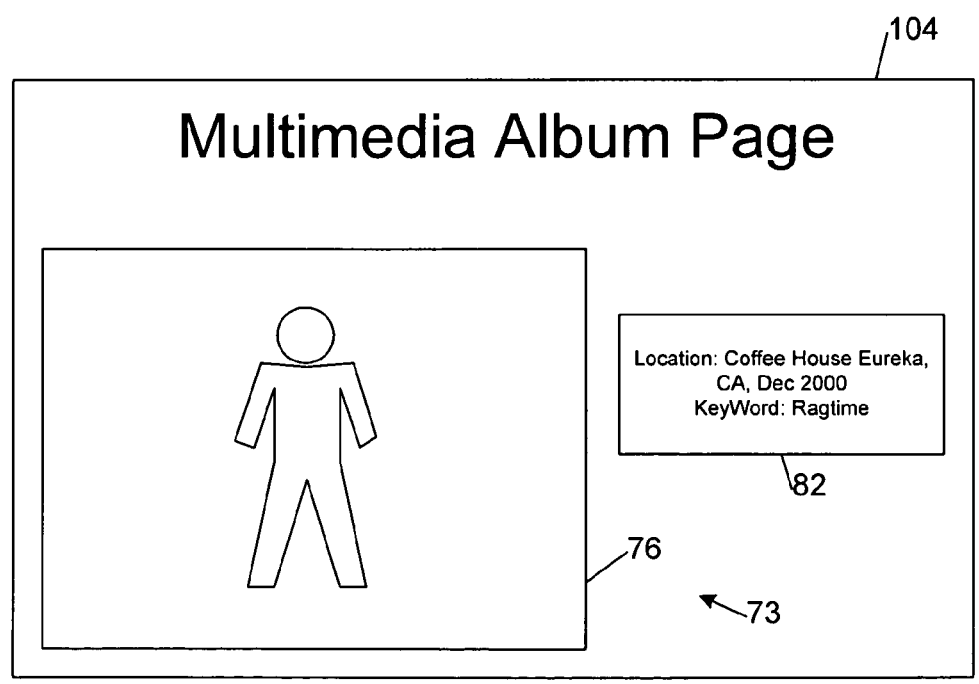
FIGS. 12A-12C are diagrammatic views of a multimedia album page during presentation of a reference video file and a selected group of media objects that are linked to the video frames of the video file.

Referring to FIG. 12A, in one illustrative example, the media file of indexed, temporally-ordered data structures being presented by media manager 12 corresponds to video file sequence 73 (FIG. 5). Initially, media manager 12 may present the video file 73 to a user by displaying the first key frame 76 of the video file sequence. In addition, media manager 12 may simultaneously present the text file annotation 82, which is linked directly to key frame 76. Text file annotation 82 may be presented only during the presentation of key frame 76, or it may be presented during the presentation of key frame 76 and for some prescribed time after key frame 76 has been presented. Depending on the size of the display area and the resources of the presentation computer, the text file annotation presentation period may be shorter than the presentation period of the entire video file sequence 73 or it may last throughout the entire video file presentation period. In the illustrated embodiment, text file annotation file 82 is presented only when key frame 76 is presented.

Figure 12B:
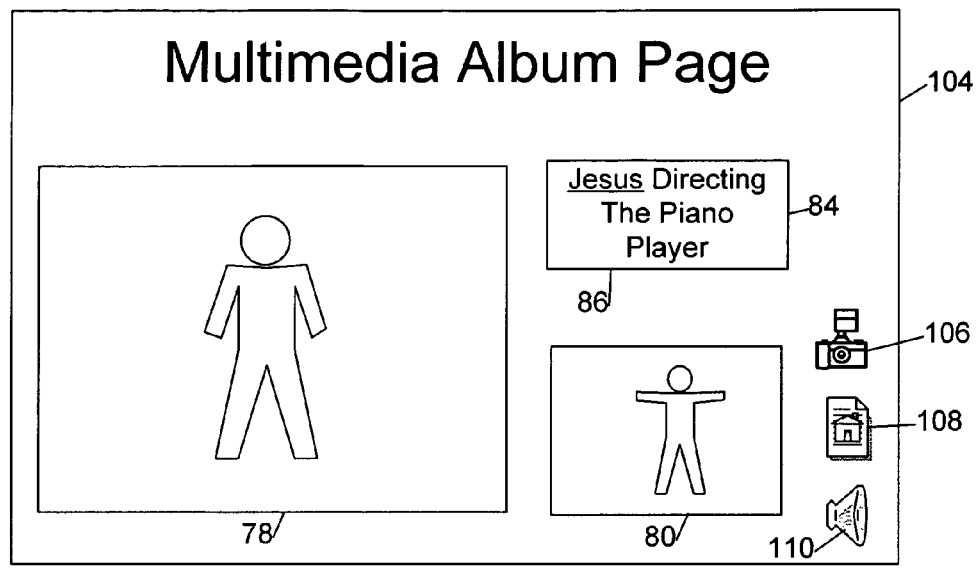

Referring to FIG. 12B, media manager 12 presents the frames of video file 73 to a user in sequence. When one or more media object links to a video frame are detected, media manager 12 presents to the user the linked media objects along with the corresponding linked video frame. In the illustrated example, when video frame 78 is displayed, media manager 12 also displays the text file annotation 84, which is linked directly to video frame 78. A user may jump from multimedia album page 104 to another page (e.g., another multimedia album page, a web page, or some other media object) by selecting hypertext link 86 that is associated with text file annotation 84.

Media manager 12 also may determine that another media object 80 in the collection is relevant to the context of video frame 78. For example, media manager 12 may instantiate a face recognition process to find a match between the person displayed in video frame 78 and the person displayed in media object 80. In the illustrated example, the relevant media object identified by media manager 12 corresponds to high resolution still photograph 80; in other embodiments, however, the identified media object may correspond to a different media object. Depending on the size of the display area and the resources of the presentation computer, media manager 12 may display the identified media object 80 only as long as it is relevant to the context currently being presented (e.g., as long as the same person appears in the presented video frames) or media manager 12 may display the media object 80 for a longer period.

In addition to displaying media object 80, media manager 12 displays graphical representations of links to media objects that are linked to media object 80. In the illustrated embodiment, media manager 12 displays a link 106 to a another page for displaying a larger version of the high resolution still photograph, a link 108 to an Internet web page corresponding to the home page of the person displayed in the high resolution photograph, and a link 110 to an audio file relating to the person displayed in the high resolution photograph (e.g., a voice greeting recorded by the displayed person). A user may select one or more of the hyperlinks 106-110 to jump from multimedia album page 104 to the corresponding linked media objects. In the illustrated embodiment, the links 106-110 are presented as icons that are rendered at locations adjacent to media object 80. As explained above, in some embodiments, activatable links may be located over certain areas of a media object being rendered in a multimedia album page. For example, an activatable link may be located over the face of the person in high resolution photograph 80; the link may lead to a media object corresponding to the person in the photograph.

Figure 12C:
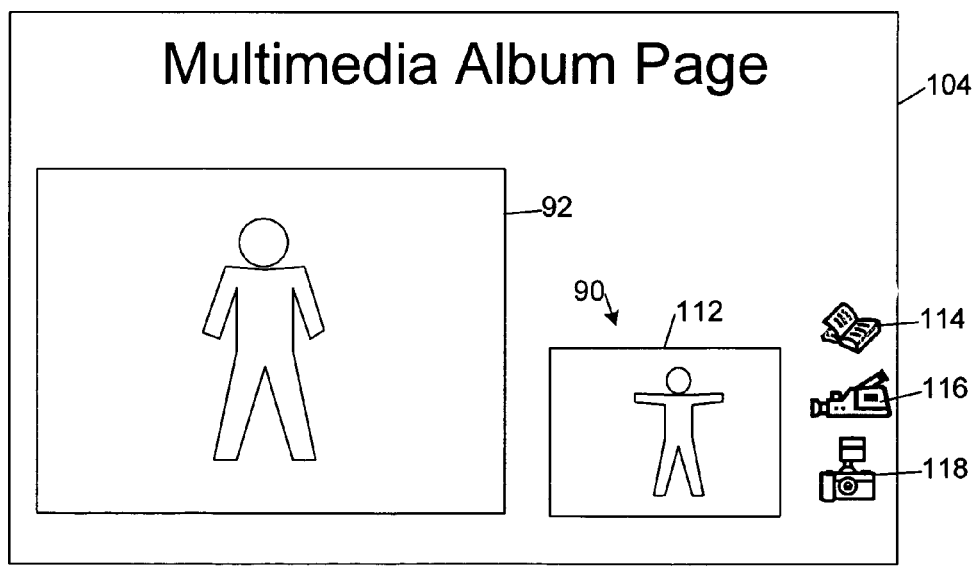

As shown in FIG. 12C, in the illustrated example, when the context changes, media manager 12 discontinues the presentation of media objects 80, 84. As mentioned above, in other implementations, media manager 12 may present multiple linked media objects at the same time during the presentation of video file 73, depending on the size of the display area and the resources of the presentation computer. If resources are constrained, media manager 12 may remove linked objects to free resources in FIFO (First In, First Out) order. When a new media object link is detected or when a new relevant media object is identified, media manager 12 presents a new media object 90 in the multimedia album page 104. In the illustrated example, media object 90 corresponds to a video file that is represented by a key frame 112 showing a person with a face that matches the person being displayed in a frame 92 of video file 73. Media manager 12 also displays graphical representations of links to media objects that are linked to media object 90. In the illustrated example, media manager 12 displays a link 114 to a multimedia album page corresponding to media object 90, a link 116 to a window for presenting the associated video file, and a link 118 to a high resolution still image of the person displayed in key frame 112. A user may select one or more of the hypertext links 114-118 to jump from multimedia album page 104 to the corresponding linked media objects.

Thus, in these embodiments, during presentation of a selected media file of indexed, temporally-ordered data structures a user may navigate through a collection of associated media objects by activating the links that are displayed to the user in a way that is context-sensitive and temporally-referenced to the playback of the selected media file of indexed, temporally-ordered data structures. In this way, new or forgotten associations may be discovered while browsing through the collection of media objects.

Authoring a Multimedia File by Browsing Media Object Links

Figure 13:
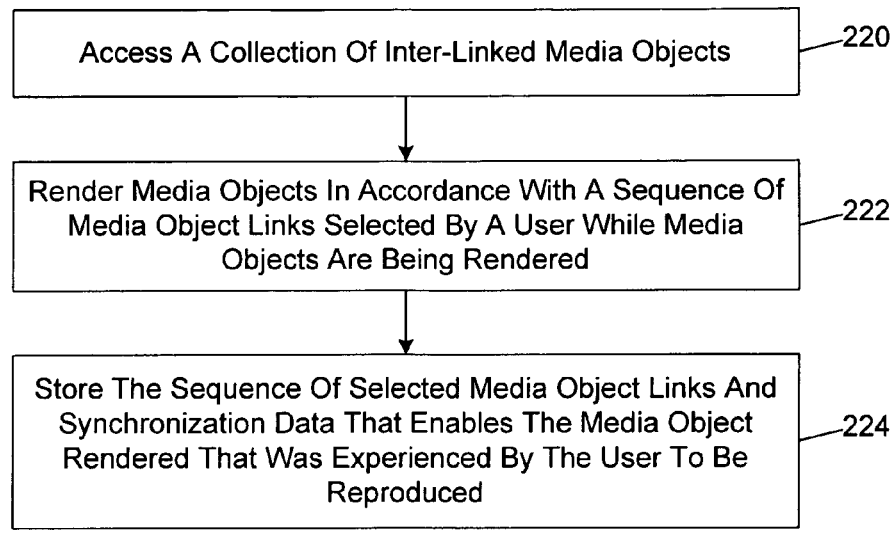
FIG. 13 is a flow diagram of a method of authoring a multimedia file.

Referring to FIG. 13, in some embodiments, media manager 12 is operable to author a multimedia file based on the browsing history of a user as follows. Initially, media manager 12 accesses a collection of previously inter-linked media objects (step 220). The locations where the media objects are stored may be specified by the user or the media objects may be stored in a predetermined (or default) location. In operation, media manager 12 sequentially renders media objects in accordance with a sequence of media object links selected by a user while media objects are being rendered, as described above (step 222). Media manager 12 stores the sequence of selected media object links and synchronization data that enables the media object rendering that was experienced by the user to be reproduced (step 224). The links and synchronization data may be formatted into a timeline-based multimedia description language, such as SMIL 2.0. Any rendering device that has access to the linked multimedia objects is able to render the multimedia objects in accordance with the user's prior browsing experience by executing the SMIL 2.0 instructions that are stored in the recorded multimedia file.

Figure 14A:
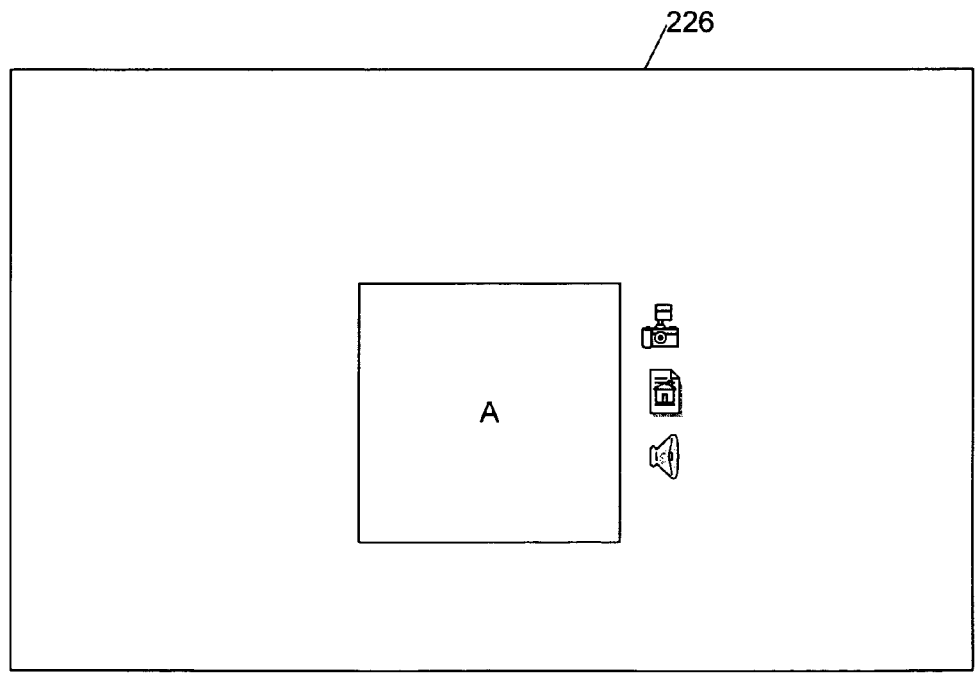
FIG. 14A is a diagrammatic view of a multimedia album page in which a first reference media object is being rendered.
Figure 14B:
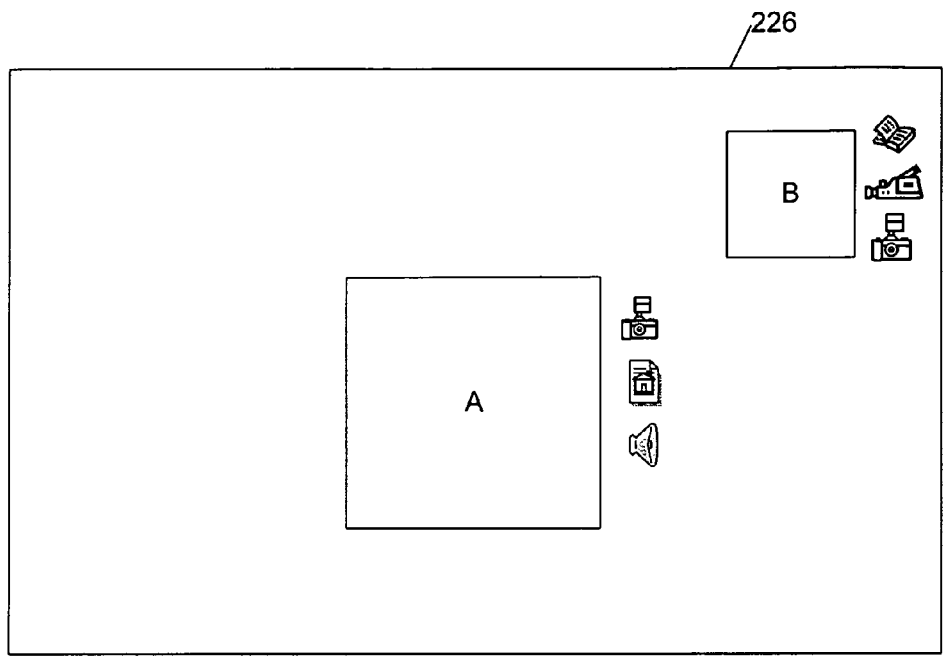
FIG. 14B is a diagrammatic view of the multimedia album page of FIG. 14A in which the first reference media object and a linked media object are being rendered concurrently.
Figure 14C:
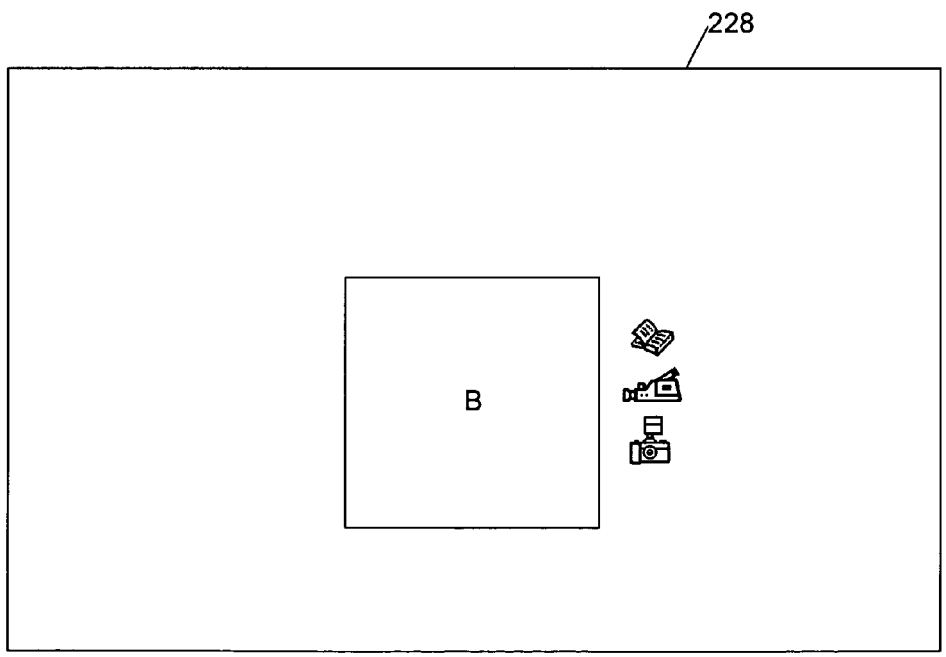
FIG. 14C is a diagrammatic view of a second multimedia album page that was selected by activating a link to the linked media object that was being rendered in the multimedia album page of FIG. 14B.
Figure 14D:
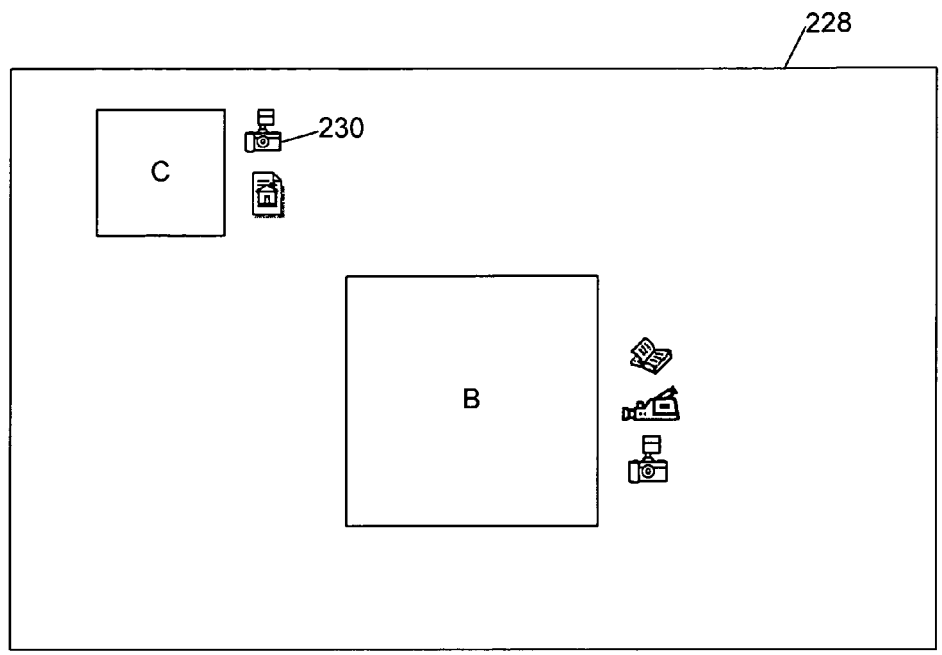
FIG. 14D is a diagrammatic view of the multimedia album page of FIG. 14C in which the second reference media object and a linked media object are being rendered concurrently.
Figure 14E:
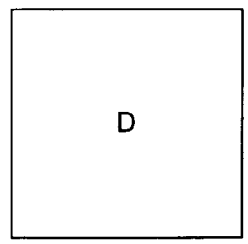
FIG. 14E is a diagrammatic view of a high-resolution still image being rendered in response to activation of a link associated with the linked media object of FIG. 14D.

Referring to FIGS. 14A-14E, in one exemplary illustration, a user may browse a collection of inter-linked media objects while media manager 12 is in a media object link recording mode as follows. A user may begin the browsing experience by viewing a multimedia album page 226 of which media object A is the reference media object (FIG. 14A). After a period of time during which media object A is being rendered, a previously linked media object B is rendered in the multimedia album page 226 concurrently with the rendering of media object A (FIG. 14B). After a period during which both media object A and media object B are being rendered, the user may activate a link to a multimedia album page 228 of which media object B is the reference media object (FIG. 14C). After a period of time during which media object B is being rendered, a previously linked media object C is rendered in the multimedia album page 228 concurrently with the rendering of media object B (FIG. 14D). After a period of during which both media object B and media object C are being rendered, the user may activate a link 230 to a high-resolution still photograph D that is associated with media object C. The high-resolution still photograph D may be presented to the user in a separate window (FIG. 14E).

Figure 15:
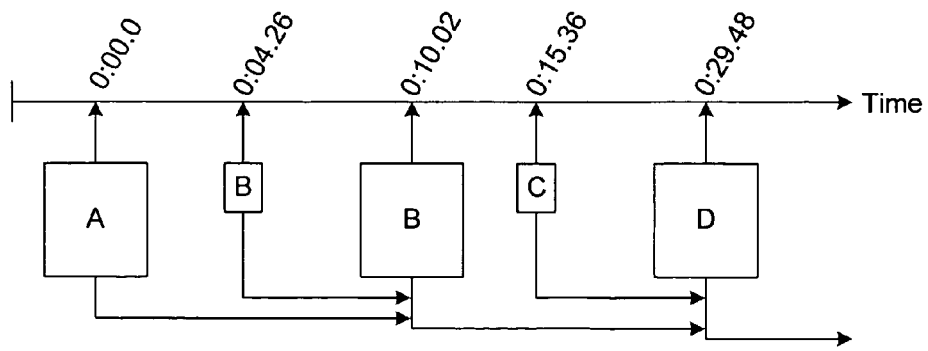
FIG. 15 is a diagrammatic timeline illustrating the media object browsing history corresponding to the sequence of FIGS. 14A-14E.

Media manager 12 may store the sequence of browsed links and synchronization information in a multimedia file that preserves the browsing experience of the user, which is illustrated graphically in the timeline of FIG. 15. In some embodiments, such a multimedia file may contain the following information:

| Time | Action |
| --- | --- |
| 0:00.00 | Begin rendering multimedia album page 226 of which media object A is the reference media object |
| 0:10.02 | Stop rendering multimedia album page 226; activate link B in multimedia album page definition file for media object A; and begin rendering multimedia album page 228 of which media object B is the reference media object |

-continued

| Time | Action |
|---|---|
| 0:19.48 | Stop rendering multimedia album page 228; activate link D in multimedia album page definition file for media object B; and begin rendering high-resolution still photograph D |

That is, in these embodiments, the only the links that were activated by the user during the recorded browsing experience and the corresponding activation times are stored in the multimedia file.

Conclusion

The systems and methods described herein are not limited to any particular hardware or software configuration, but rather they may be implemented in any computing or processing environment, including in digital electronic circuitry or in computer hardware, firmware or software. These systems and methods may be implemented, in part, in a computer program product tangibly embodied in a machine-readable storage device for execution by a computer processor or specially-designed ASIC (application-specific integrated circuit). In some embodiments, these systems and methods preferably are implemented in a high level procedural or object oriented programming language; however, the algorithms may be implemented in assembly or machine language, if desired. In any case, the programming language may be a compiled or interpreted language. The media object management methods described herein may be performed by a computer processor executing instructions organized, e.g., into program modules to carry out these methods by operating on input data and generating output.

Other embodiments are within the scope of the claims.

What is claimed is:

1. A method of authoring a multimedia file, comprising:
   accessing a collection of media objects, including a reference media object of indexed temporally-ordered data structures;
   rendering the reference media object; and
   while the reference media object is being rendered, linking a media object in the collection to the reference media object with a rendering time synchronized to the rendering of the reference media object.

2. The method of claim 1, wherein multiple reference media objects are rendered at respective rendering timeframes, and one or more media objects in the collection are linked to respective reference media objects with respective rendering times synchronized to the rendering times of the respective linked reference media objects.

3. The method of claim 1, wherein rendering comprises sequentially displaying in a screen representations of the data structures of the reference media object.

4. The method of claim 3, further comprising displaying on the screen one or more symbols corresponding to respective media objects in the collection while the reference media object is being rendered.

5. The method of claim 4, wherein a given media object is linked to the reference media object in response to user input selecting a symbol corresponding to the given media object.

6. The method of claim 5, further comprising displaying media object symbols in a media object catalogue area of the screen and rendering the reference media object in an authoring area of the screen.

7. The method of claim 6, wherein the given media object is linked to the reference media object in response to dragging and dropping the corresponding media object symbol from the media object catalogue area to the authoring area of the screen by a user.

8. The method of claim 7, wherein the synchronized rendering time corresponds to a time when the selected media file is dropped in the authoring area of the screen.

9. The method of claim 7, wherein linking a selected media object to the reference media object further comprises storing an indication of where the selected media object is to be rendered during rendering of the reference media object based on where the selected media object is dropped by the user in the authoring area of the screen.

10. The method of claim 7, further comprising storing an indication of when rendering of the selected media file is to stop in response to user input.

11. The method of claim 10, wherein the stored stop indication corresponds to a time when the user drags the selected media object out of the authoring area of the screen.

12. The method of claim 3, further comprising rendering on the screen one or more media objects in the collection linked to the reference media object at respective times synchronized with the rendering of the reference media object.

13. The method of claim 12, wherein the reference media object and the synchronized media objects are rendered in a first window displayed on the screen, and further comprising rendering in a second window a second reference media object corresponding to one of the synchronized media objects in response to user input selecting the corresponding media object.

14. The method of claim 13, further comprising, while the second reference media object is being rendered, linking a media object in the collection to the second reference media object with a rendering time synchronized to the rendering of the second reference media object.

15. The method of claim 13, wherein the first window is closed before the second window is opened.

16. The method of claim 13, further comprising rendering in the second window one or more media objects in the collection linked to the second reference media object at respective times synchronized with the rendering of the second reference media object.

17. The method of claim 1, wherein linking a selected media object to the reference media object comprises storing a pointer to the selected media object with a start time specifying when the selected media object is to be rendered during rendering of the reference media object.

18. The method of claim 1, wherein linking a selected media object to the reference media object further comprises storing an indication of when rendering of the selected media file is to stop.

19. The method of claim 1, wherein linking a selected media object to the reference media object further comprises storing an indication of where the selected media object is to be rendered during rendering of the reference media object.

20. The method of claim 1, wherein linking a selected media object to the reference media object comprises linking the selected media object to a data structure of the reference media object.

21. The method of claim 20, wherein linking a selected media object to the reference media object comprises linking an activatable link to a particular location in the linked data structure.

22. The method of claim 1, wherein media objects comprise one or more of the following: text, audio, graphics, still image, and full-motion video.

23. The method of claim 1, wherein the reference media object is a video file comprising a sequence of full-motion video frames, and the linking comprises storing a link that is browsable from a given one of the video frames of the video file to a connected one of the media objects and from the connected media object to the given video frame.

24. A system for authoring a multimedia file, comprising a media manager operable to:
  access a collection of media objects, including a reference media object of indexed temporally-ordered data structures;
  render the reference media object; and
  while the reference media object is being rendered, link a media object in the collection to the reference media object with a rendering time synchronized to the rendering of the reference media object.

25. A method of authoring a multimedia file, comprising:
  accessing a collection of inter-linked media objects;
  sequentially rendering media objects in accordance with a sequence of media object links selected by a user while media objects are being rendered; and
  storing the sequence of selected media object links and synchronization data enabling reproduction of media object rendering experienced by the user.

26. The method of claim 25, wherein synchronization data includes indications of rendering duration for media objects.

27. The method of claim 25, wherein rendering media objects includes concurrently rendering with at least one reference media object one or more media objects linked to the reference media object.

28. The method of claim 27, wherein the at least one media object includes at least one reference media object of indexed temporally-ordered data structures.

29. The method of claim 28, wherein the at least one reference media object comprises a sequence of full-motion video frames.

30. The method of claim 25, wherein accessing the media object collection includes accessing multiple multimedia album page files each specifying at least one respective reference media object in the collection, at least one of the multimedia album page files containing links to one or more media objects in the collection and respective rendering times synchronized to the respective reference media object of the corresponding multimedia album page files.

31. The method of claim 25, wherein storing links includes storing links to multimedia album page files ordered in accordance with rendering times of the multimedia album page files.

32. A system for authoring a multimedia file, comprising a media manager operable to:
  access a collection of inter-linked media objects;
  sequentially render media objects in accordance with a sequence of media object links selected by a user while media objects are being rendered; and
  store the sequence of selected media object links and synchronization data enabling reproduction of media object rendering experienced by the user.

33. The method of claim 1, wherein the reference media object is a media file of indexed, temporally-ordered data structures, and the linking comprises storing a link between a selected one of the media objects in the collection and a specified data structure of the media file, the stored link being browsable from the specified data structure to the selected media object and from the selected media object to the specified data structure.

34. The method of claim 25, wherein the sequential rendering comprises rendering a given one of the media objects in response to the user's selection of a respective link from a respective one of the media objects to the given media object.

35. The method of claim 25, wherein the storing comprises storing the user's selection of ones of links that interconnect the media objects in the collection.

* * * * *